United States Patent [19]
Griffin et al.

[11] Patent Number: 5,535,385
[45] Date of Patent: Jul. 9, 1996

[54] DEALING WITH SIDE EFFECTS OF TRANSACTIONS IN DATA BASE SYSTEMS USING A MULTI-SET ALGEBRA

[75] Inventors: Timothy G. Griffin, Berkeley Heights; Leonid Libkin, Basking Ridge, both of N.J.

[73] Assignee: AT&T Corp., Murray Hill, N.J.

[21] Appl. No.: 444,467

[22] Filed: May 19, 1995

[51] Int. Cl.$^6$ .................................................. G06F 17/30
[52] U.S. Cl. .................................. 395/600; 364/DIG. 1; 364/283.4
[58] Field of Search ............................................. 395/600

[56] References Cited

PUBLICATIONS

S. Grumbach, T. Milo, "Towards Tractable Algebras for Bags", Proceedings of Principles of Database Systems, PODS '93.
L. Libkin, L. Wong, "New Techniques for Studying Set Languages, Bag Languages and Aggregate Functions", Proceedings of Principles of Database Systems, PODS '94.
L. Libkin, L. Wong, "Some Properties of Query Languages for Bags", Proceedings of Database Programming Languages, 1993.
S. Ceri, J. Widom, "Deriving Production Rules for Incremental View Maintenance", Proceedings of 1991 VLDB Conference, pp. 577–589.
X. Qian, G. Wiederhold, "Incremental Recomputation of Active Relational Expressions", IEEE Transactions on Knowledge and Date Engineering, vol. 3, No. 3, Sep. 1991.
A. Gupta, I. S. Mumick, V. S. Subrahmanian, "Maintaining Views Incrementally", SIGMOD '93.
J. Srivastava, D. Rotem, "Analytical Modeling of Materialized View Maintenance", PODS '88.
J. A. Blakeley, P. Larson, F. W. Tompa, "Efficiently Updating Materialized Views", Proceedings of Sigmod '86, Washington, D.C. May 28–30, 1986.
E. N. Hanson, "A Performance Analysis of View Materialization Strategies", Proceedings of SIGMOD, May 27–29, 1987.
A. Gupta, I. S. Mumick, "Maintenance of Materialized Views: Problems, Techniques, and Applications", Bulletin of the Technical Committee on Data Engineering, vol. 18, No. 2, Jun. 1995.

*Primary Examiner*—Thomas G. Black
*Assistant Examiner*—John C. Loomis
*Attorney, Agent, or Firm*—Gordon E. Nelson

[57] ABSTRACT

Apparatus and methods for reducing the amount of computation required to determine the consequences of a side effect resulting from a transaction on a relation in a data base system. The apparatus and methods use equational reasoning based on a bag algebra representation of a class of transaction and the relation to produce a pre-expression which describes the side effect. The pre-expression is included in the data base system's data dictionary, and when a transaction of the class is received in the data base system, the pre-expression is used to determine the side effect. The pre-expression is formed with a strongly-minimal pair of delete and insert bags. The apparatus and methods may be used to maintain materialized views, to check for violation of constraints on the data base, and to activate triggers, monitors, and active queries.

37 Claims, 6 Drawing Sheets

PRIOR ART
101

DATA DICTIONARY
123

| PID | COST | DATE |
|---|---|---|
| P1 | 1,200 | 09/12 |
| P2 | 2,100 | 08/27 |
| P3 | 1,300 | 09/11 |
| P4 | 1,400 | 08/25 |

(503, 501, 505)

S2 (507)

| PID | COST | DATE |
|---|---|---|
| P1 | 1,200 | 09/05 |
| P4 | 1,400 | 08/24 |
| P5 | 4,000 | 09/03 |

PAID (511)

| PID | COST | S |
|---|---|---|
| P1 | 1,200 | 1 |
| P5 | 4,000 | 2 |

UNPAID (513)

| PID | COST |
|---|---|
| P1 | 1,200 |
| P2 | 2,100 |
| P3 | 1,300 |
| P4 | 1,400 |
| P4 | 1,400 |

FIG. 6

P1. $\sigma_p(S \div \triangledown S) =_b \sigma_p(S) \div \sigma_p(\triangledown S)$ P2. $\sigma_p(S \uplus \triangle S) =_b \sigma_p(S) \uplus \sigma_p(\triangle S)$ P3. $\Pi_A(S \div \triangledown S) =_b \Pi_A(S) \div \Pi_A(\triangledown S \text{ MIN } S)$ P4. $\Pi_A(S \uplus \triangle S) =_b \Pi_A(S) \uplus \Pi_A(\triangle S)$ P5. $(S \div \triangledown S) \uplus T =_b (S \uplus T) \div (\triangledown S \text{ MIN } S)$ P6. $(S \uplus \triangle S) \uplus T =_b (S \uplus T) \uplus \triangle S$ P7. $(S \div \triangledown S) \div T =_b (S \div T) \div \triangledown S$ P8. $S \div (T \div \triangledown T) =_b (S \div T) \uplus ((\triangledown T \text{ MIN } T) \div (T \div S))$ P9. $(S \uplus \triangle S) \div T =_b (S \div T) \uplus (\triangle S \div (T \div S))$ P10. $S \div (T \uplus \triangle T) =_b (S \div T) \div \triangle T$ P11. $(S \div \triangledown S) \text{ MIN } T =_b (S \text{ MIN } T) \div (\triangledown S \div (S \div T))$ P12. $(S \uplus \triangle S) \text{ MIN } T =_b (S \text{ MIN } T) \uplus (\triangle S \text{ MIN } (T \div S))$ P13. $(S \div \triangledown S) \text{ MAX } T =_b (S \text{ MAX } T) \div (\triangledown S \text{ MIN } (S \div T))$ P14. $(S \uplus \triangle S) \text{ MAX } T =_b (S \text{ MAX } T) \uplus (\triangle S \div (T \div S))$ P15. $\epsilon(S \div \triangledown S) =_b \epsilon(S) \div (\epsilon(\triangledown S \text{ MIN } S) \div (S \div \triangledown S))$ P16. $\epsilon(S \uplus \triangle S) =_b \epsilon(S) \uplus (\epsilon(\triangle S) \div S)$ P17. $(S \div \triangledown S) \times T =_b (S \times T) \div (\triangledown S \times T)$ P18. $(S \uplus \triangle S) \times T =_b (S \times T) \uplus (\triangle S \times T)$ (601)

| Q | ▽(t,Q) | # |
|---|--------|---|
| R | ▽R, IF R ← (R ÷ ▽R) ⊎ △R IS IN t, AND ∅ OTHERWISE | ▽1 |
| σ_ρ(S) | σ_ρ(▽(t,S)) | ▽2 |
| Π_A(S) | Π_A(▽(t,S)) ÷ Π_A(△(t,S)) | ▽3 |
| S ⊎ T | (▽(t,S) ÷ △(t,T)) ⊎ (▽(t,T) ÷ △(t,S)) | ▽4 |
| S ÷ T | ((▽(t,S) ÷ ▽(t,T)) ⊎ (△(t,T) ÷ △(t,S))) MIN Q | ▽5 |
| S MIN T | (▽S ÷ (S ÷ T)) MAX (▽T ÷ (T ÷ S)) | ▽6 |
| S MAX T | (▽(t,S) ⊎ (▽(t,T) MIN (T ÷ ADD(t,S)))) MIN (▽(t,T) ⊎ (▽(t,S) MIN (S ÷ ADD(t,T)))) | ▽7 |
| ε(S) | ε(▽(t,S)) ÷ DEL(t,S) | ▽8 |
| S × T | (▽(t,S) × ▽(t,T)) ⊎ ((DEL(t,S) × ▽(t,T)) ÷ (△(t,S) × DEL(t,T))) ⊎ ((▽(t,S) × DEL(t,T)) ÷ (DEL(t,S) × △(t,T))) | ▽9 |

705

| Q | △(t,Q) | # |
|---|--------|---|
| R | △R, IF R ← (R ÷ ▽R) ⊎ △R IS IN t, AND ∅ OTHERWISE | △1 |
| σ_ρ(S) | σ_ρ(△(t,S)) | △2 |
| Π_A(S) | Π_A(△(t,S)) ÷ Π_A(▽(t,S)) | △3 |
| S ⊎ T | (△(t,S) ÷ ▽(t,T)) ⊎ (△(t,T) ÷ ▽(t,S)) | △4 |
| S ÷ T | ((△(t,S) ÷ △(t,T)) ⊎ (▽(t,T) ÷ ▽(t,S))) ÷ (T ÷ S) | △5 |
| S MIN T | (△(t,S) ⊎ (△(t,T) MIN (DEL(t,S) ÷ T))) MIN (△(t,T) ⊎ (△(t,S) MIN (DEL(t,T) ÷ S))) | △6 |
| S MAX T | (△S ÷ (T ÷ S)) MAX (△T ÷ (S ÷ T)) | △7 |
| ε(S) | ε(△(t,S)) ÷ S | △8 |
| S × T | (△(t,S) × △(t,T)) ⊎ ((DEL(t,S) × △(t,T)) ÷ (▽(t,S) × T)) ⊎ ((△(t,S) × DEL(t,T)) ÷ S × ▽(t,T)) | △9 |

DEALING WITH SIDE EFFECTS OF TRANSACTIONS IN DATA BASE SYSTEMS USING A MULTI-SET ALGEBRA

BACKGROUND OF THE INVENTION

1. Field of the Invention

The present invention concerns data base system generally and more specifically concerns side effects of transactions in data base systems.

2. Description of the Prior Art

A popular type of data base system is the relational data base system, in which the data in the data base is logically organized into relations, that is, tables with rows and columns. When a user of a data base system wishes to obtain information from it, the user makes a query, which describes the information to be obtained in terms of relations, columns, and limitations on the values of the columns in individual rows. The result of the query is another relation, which is termed a view. The relations from which the view is computed are termed the base relations of the view. If the view is in turn used as a base relation in the computation of a second view, the computation of the second view may be speeded up by materializing the view, that is, storing it in the data base system, rather than recomputing it each time it is used as a base relation.

In addition to querying data bases, users often add information to the data base and delete information from the data base. Adding or deleting information is termed a transaction. Of course, when a transaction changes a relation which is a base relation for a materialized view, the materialized view may need to be changed as well. One way of changing the materialized view is to recompute it from the base relations, but the whole point of the materialized view is to avoid recomputation. The problem of finding ways of updating materialized views without completely recomputing them is termed in the art the view maintenance problem.

Materialized views are however not the only components of data base systems which are affected by changes in base relations. Many data base systems have components which monitor changes in the data base and take actions if certain changes occur. Included among these components are integrity constraints, that is, rules for preventing transactions which are inconsistent with some property of the data base, monitors, which notify the user when certain changes occur, triggers, which take action when the changes occur, and active queries, which are computed in response to triggers. The same techniques which are used to avoid complete recomputation of views when a base relation changes can also be used generally to reduce the amount of computation needed to determine whether an action is to take place in response to a change in a base relation.

For the most part, prior art solutions to the view maintenance problem have been algorithmic, that is, for each kind of change to the base relations, an algorithm is provided which computes the changes to the view base relations, an algorithm is produced that computes the changes to the view. A typical example of the algorithmic approach is S. Ghandeharizadeh, R. Hull, D. Jacobs et al., On implementing a language for specifying active database execution models, In: *Proc.* VLDB-93. Qian and Widerhold have employed equational reasoning, that is, the change required in the view which is required by the change in the base relations is determined by means of a series of algebraic translations of the change in the base relations. See X. Qian and G. Wiederhold, Incremental Recomputation of Active Relational Expressions, *IEEE Transactions on Knowledge and Data Engineering*, 3(3):337"341,1991.

Equational reasoning offers a number of advantages over the algorithmic approach:

- Unlike the algorithmic approach, it provides us with precise semantics of changes to the views. Consequently, using the equational approach makes it easier to prove correctness of the change propagation algorithm.
- This approach is robust: if language changes (e.g. new primitives are added), one only has to derive new rules for the added primitives, leaving all other rules intact. As long as the new rules are correct, the correctness of the change propagation algorithm is not affected.
- The resulting changes to the view are obtained in form of expressions in the same language used to define the view. This makes additional optimizations possible. For example, the expressions for changes that are to be made (e.g. for sets/bags of tuples to be deleted/added) can be given as an input to any query optimizer that might find an efficient way of calculating them.

Qian and Wiederhold's work and most of the algorithmic approaches have assumed that relations are set-valued, that is, duplicate rows are eliminated from the view. However, most practical database systems do not eliminate duplicates from views, and consequently cannot be modelled by sets. Instead, they must be modelled by bags, that is, multisets, or collections in which duplicates are permitted. The ability to handle duplicates is particularly important in dealing with aggregate functions in data base systems. Such functions obtain a value by aggregating other values. For instance, if the average salary of employees is to be computed, then one applies the aggregate function AVG to $\Pi_{Salary}$(Employees). Duplicates cannot be removed from the view since the result would be wrong when at least two employees had the same salary. Not eliminating duplicates also speeds up query evaluation, as duplicate elimination is generally a rather expensive operation.

Unfortunately, the theoretical work done on relations that are assumed to have no duplicates does not carry over to relations that do have them. Further, the little work which has been done on view maintenance when duplicates are present is algorithmic, see A. Gupta, I. S. Mumick, and V. S. Subrahmanian, Maintaining views incrementally, in: *SIGMOD-93*, pp. 157–166. Finally, Qian and Wiederhold's work contains an error which renders it unable to guarantee a minimality condition, namely that no rows are changed unnecessarily in the view being updated in response to a change in its base relations.

It is thus an object of the present invention to provide solutions for the view update problem which take the existence of duplicate rows in the view into account, which employ equational reasoning, and which are in fact able to guarantee a strong minimality condition.

SUMMARY OF THE INVENTION

The above object is achieved by making a definition of the side effect resulting from the transaction in terms of the relation or relations whose alteration by the transaction causes the side effect. The definition is then transformed using equational reasoning into a pre-expression which defines the effects of the side effect and can deal correctly with duplicates. In a preferred embodiment, the method deals correctly with duplicates because the definition, the equational reasoning, and the pre-expression are all done in terms of a bag algebra. One important application of the invention is making updates of materialized views.

Other objects and advantages of the apparatus and methods disclosed herein will be apparent to those of ordinary skill in the art upon perusal of the following Drawing and Detailed Description, wherein:

BRIEF DESCRIPTION OF THE DRAWING

FIG. 5 shows example base relations and an example view relation;

FIG. 6 shows change propagation equations used in a preferred environment; and

FIG. 7 shows recursive functions used in a preferred embodiment to compute a pre-expression.

Figure 1:
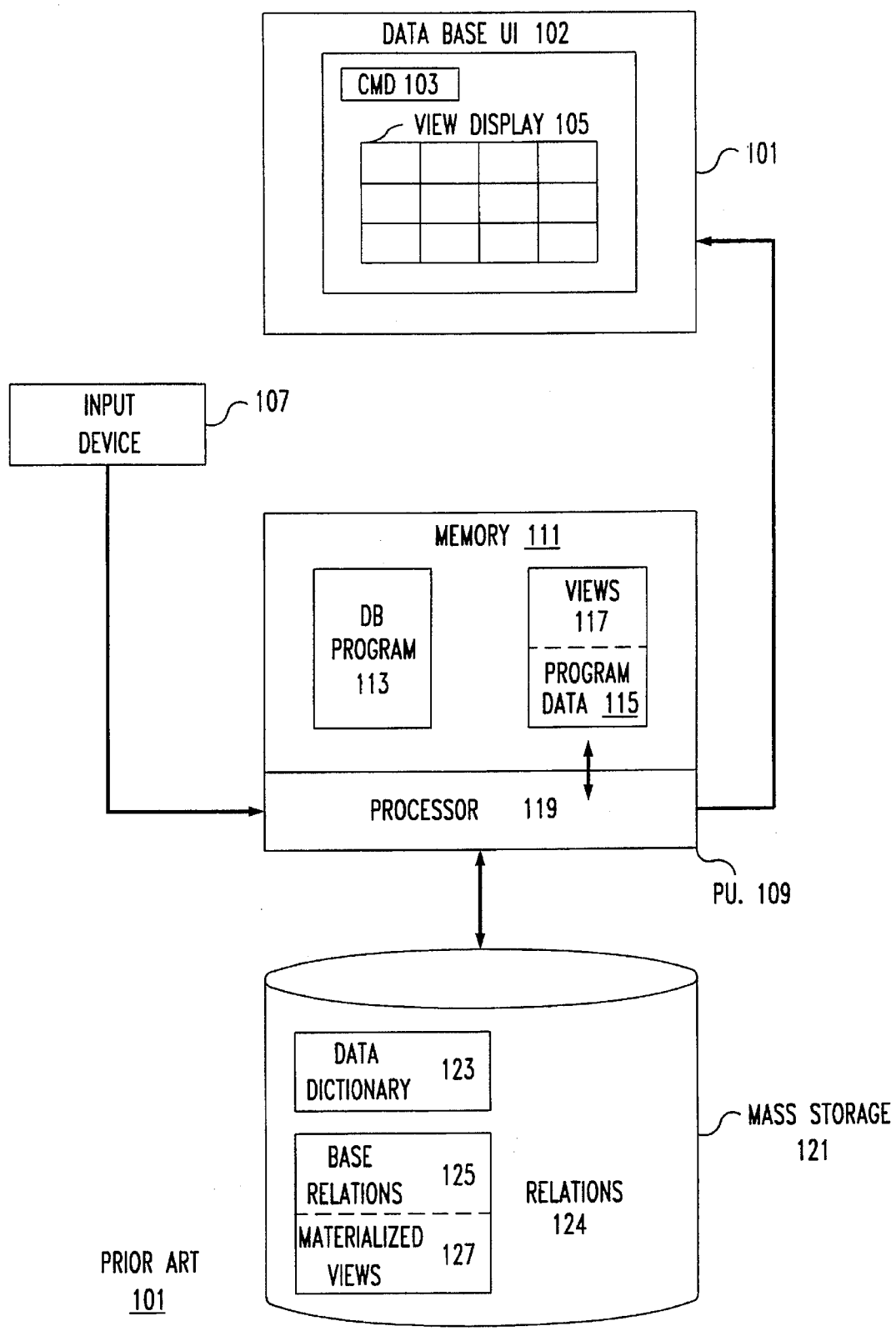
FIG. 1 is a block diagram of a prior-art data base system.

Reference numbers in the Drawing have two parts: the two least-significant digits are the number of an item in a figure; the remaining digits are the number of the figure in which the item first appears. Thus, an item with the reference number 201 first appears in FIG. 2.

DETAILED DESCRIPTION OF A PREFERRED EMBODIMENT

The following Detailed Description will begin with an overview of a data base system, will then present a general view of the problem of materialized view maintenance and the details of how equational reasoning may be employed in materialized view maintenance, and will finally present details of an implementation of materialized view maintenance in a data base system.

Figure 2:
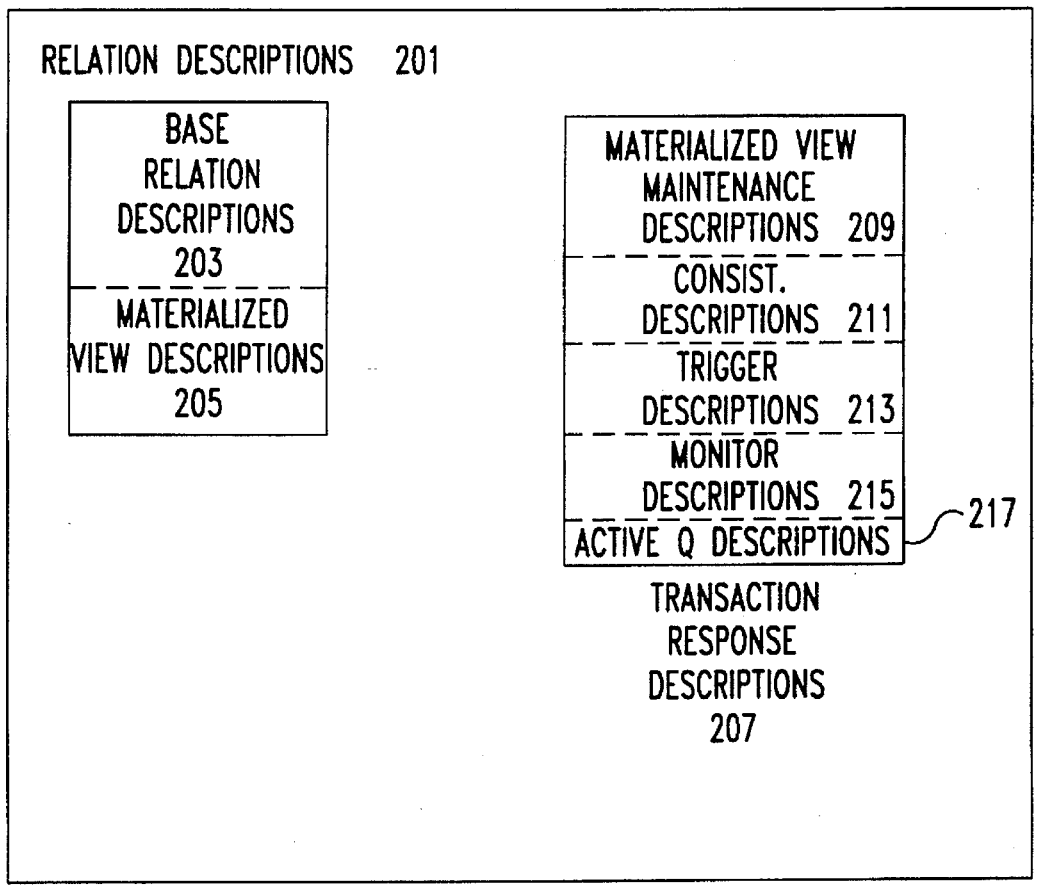
FIG. 2 is a diagram of a data dictionary.

Overview of a Data Base System: FIGS. 1 and 2

FIG. 1 is a block diagram of a data base system 101 implemented in a digital computer system. The digital computer system has the usual components: a processor unit 109 with a processor 119 and a memory 111, an input device 107, for example a keyboard or a pointing device such as a mouse, connected to processor unit 109 for receiving inputs from a user, an output device 101 such as a CRT or flat panel display for displaying output from processing unit 109 to the user, and mass storage device 121, for example, a hard disk drive, which stores persistent data. The digital computer system may be of any size, from a personal computer to a mainframe or supercomputer.

When the digital computer system is being used to implement a data base system 101, processor 119 is executing a data base program 113 from memory 111 using program data 115. As the digital computer system executes the program, it responds to inputs from input device 107 and displays outputs on display 101. Data base user interface 102, which controls operation of data base system 101, is displayed in a window of display 101. For present purposes, data base user interface 102 has two components: command area 103 and view display 105 Command area 103 displays input from input device 107. The input may be a query, in which case, a view 117 which satisfies the query is constructed in memory 111 and is displayed in view display 105, or it may be a transaction, in which case data base system 101 changes the data it contains as specified in the transaction.

The actual information in the data base is generally contained in mass storage 121, although it may be maintained in memory 111 in systems where extremely rapid access is required. The information itself is contained in relations 124. There are two kinds of relations: base relations 125, in which the data in the data base is originally stored, and which are therefore the relations that are directly changed in a transaction, and materialized views, which are views, i.e., relations derived from other relations by a query, which have been written to mass storage 121. Data dictionary 123, finally, is what makes the data in relations 124 into relations. For each relation in relations 124, data dictionary 123 specifies the relation's name, the names and data types of the relations's column, and the actual location of the data for the relation in mass storage 121.

To operate data base system 101, a user uses input device 107 to input a command to command display 103. The command may specify either a transaction or a query. In either case, relations and fields in relations are specified in the command by name and the command may also specify conditions on field values. The command is typically written in a query language such as SQL, but graphical command interfaces may also be employed. If the command is a query, processor 119 under control of data base program 113 responds to the query by using data dictionary 123 to interpret the relation names and field names in the query, retrieves the rows and fields specified in the query into program data 115 in memory 111, uses the conditions to determine which of the retrieved rows and fields are to be used in view 117 specified by the query, sets up view 117 in memory 111, and then displays it in view display 105.

If the command is a transaction, it specifies relations, fields, and perhaps even conditions as in a query, but it additionally specifies changes in the relations or fields, for example, deletions or additions of rows in relations or changes in the values of fields. Processor 119 under control of data base program 113 again uses data dictionary 123 to interpret the transaction and locate the row which needs to be deleted or changed or to determine where a new row should be stored in mass storage 121. In the case of a deletion, data base program deletes the indicated row; in the case of an addition or change, program 113 constructs the new record in program data 115 and then writes it to the proper location in mass storage 121.

As is apparent from the foregoing description of data base system 101, data dictionary 123 contains the descriptions which permit data base program 113 to properly interpret queries and transactions. FIG. 2 presents a block diagram of a data dictionary 123 of the type employed in systems which require view maintenance. For present purposes, two parts of data dictionary 123 are of interest: relation descriptions 201 and transaction response descriptions 207. Relation descriptions 201 contain a description of each of the relations 124 in mass storage 121. In a system which materializes views, there are two kinds of relation descriptions: base relation descriptions 203, which describe base relations 125, and materialized view descriptions 205, which describe materialized views. A materialized view description 205 is locatable in data dictionary 123 from the base relation descriptions 203 for the base relations used to make the view.

Transaction response descriptions 207 describe data base system 101's responses to a change in a relation in relations 124. As indicated above, depending on the data base system, the responses may include maintaining materialized views (209), performing consistency checks (211), executing trigger code (211), executing monitor code (215), and performing active queries (217). Transaction response descriptions which involve a particular base relation are accessible from the base relation description 203 for the base relation. When data base system 101 executes a transaction, the transaction response descriptions 207 for the base relations involved in the transaction are checked and if any of them describes the transaction being performed, the responses specified in the transaction response descriptions are carried out as part of the transaction.

Producing Improved Response Descriptions

As pointed out in the Description of the Prior Art, supra, the prior art has not provided techniques for producing transaction response descriptions which were both based on equational reasoning and were able to deal with duplicates. The following discussion of novel techniques for producing such transaction response descriptions begins with an example which illustrates the inadequacies of prior-art techniques based on equational reasoning for producing transaction response descriptions, then explains the bag algebra upon which the novel techniques are based, next specifies the equations underlying the novel techniques, and finally presents the algorithm which implements the equations.

An Example: FIG. 5

FIG. 5 shows a data base 501 which will be used as an example in the following discussion. Data base 501 has three base relations, indicated by the reference numbers 502, 507, and 511, and a view 513. Each relation is a table which is made up of one or more rows 503 and columns 505. Relations S1(Pid, Cost, Date) 502 S2(Pid, Cost, Date) 507 are relations for recording shipments of parts received from two different suppliers. In the notation used to describe the relations, S1 is the name of the relation and the names in parentheses following the name of the relation are the names of the columns. Thus, each row in relations S1 and S2 has three attributes (or fields). The attribute Pid is a unique identifier for the part with which the row is concerned. Cost is the cost of the part identified by Pid, and Date is the day the shipment which included the part arrived. In addition we have the relation Paid(Pid, Cost, S), which is a table of parts that have already been paid for. Since there are only two suppliers, S1 and S2, The attribute S in this relationship must have either the value 1 or the value 2, indicating which supplier was paid.

We would like to compute the total amount of money we owe—the cost of all parts received by not yet paid for. One way of doing this is to define a view Unpaid 513 which contains a row for each part which has been received but not yet paid for. The attributes of the row are Pid and Cost. Once the view has been computed, the total amount owed can be found by adding the values in Cost. One way of defining Unpaid 513 is to produce a first view $V_1$ which contains rows made up of the Pid and Cost fields from both S1 and S2 and a second view $V_2$ which contains rows made up of the Pid and Cost fields from Paid, and then produce Unpaid by finding all the rows in $V_1$ which are not in $V_2$.

A definition of these operations in bag algebra uses the projection operator $\Pi$, the additive union operator $\uplus$, and the monus operator $-$. $\Pi$ makes a relation which has a row for each row of the relation from which the projection is made, but has only the attributes specified in the operation. $\uplus$ is a union operator that includes duplicates when it makes a union of two bags. $-$ subtracts multiplicities. If a record r occurs n times in S and m times in T, then the number of occurrences of r in S–T is n–m if $n \geq m$ and 0 if n<m. The bag algebra definition looks like this:

$$V_1 \stackrel{def}{=} (\Pi_{Pid,Cost}(S1) \uplus \Pi_{Pid,Cost}(S2))$$

$$V_2 \stackrel{def}{=} \Pi_{Pid,Cost}(Paid)$$

$$Unpaid \stackrel{def}{=} V_1 - V_2$$

Here, because $\uplus$ is used, $V_1$ contains two copies of the record [Pid⇒P1, Cost⇒1,200]. Because– is used, Unpaid contains 1 row for P1 and two rows for P4.

Once we have Unpaid, the TOTAL() aggregation operator can be used to obtain the amount still owed:

$$Owe=TOTAL(\Pi_{Cost}(Unpaid))$$

Note that multiset semantics gives the correct answer here, while set-theoretic semantics, which do not permit duplicate rows, do not. For example, for the relations shown in FIG. 5, the amount Owe is $7,400. However, if we switch to set semantics and calculate Unpaid as $(\Pi_{Pid,Cost}(S1) \cup \Pi_{Pid,Cost}(S2))-\Pi_{Pid,Cost}(Paid)$, then Owe calculated by the same formula equals $4,800.

The materialized view maintenance problem arises if we materialize Unpaid 513. Then, if we find that Paid contains a mistake, for instance, a payment was made to supplier S1 for part P3 instead of to supplier S2 for part P5 and we correct the mistake in Paid, we must also update Unpaid. In the bag algebra, this correction is represented by using the delete bag $\nabla$Paid to represent the rows that the correction will delete from Paid and the insert bag $\Delta$Paid to represent the rows that the correction will insert in Paid. The transaction which corrects Paid may thus be described in the bag algebra as follows:

$$Paid^{new}=(Paid-\nabla Paid)+e,sez\ U++ee\ \Delta Paid.$$

Rather than recomputing the entire view Unpaid from scratch, we would like to find expressions $\nabla$Unpaid and $\Delta$Unpaid such that $$Unpaid^{new}=(Unpaid-\nabla Unpaid)+e,sez\ U++ee\ Unpaid.$$

This has the potential of greatly reducing the amount of computational resources needed to recompute this new value.

As required for our correction, let $\nabla$Paid contain the single record [Pid⇒P5 Cost⇒4,000, S⇒2] and $\Delta$Paid contain the single record [Pid⇒P3, Cost⇒1,300, S⇒1]. (That is, we discovered that a payment was made to the first supplier for P3 rather than the second for P5.) Then it is fairly easy to see that $\nabla$Unpaid should evaluate to [Pid⇒P3, Cost⇒1,300] and that $\Delta$Unpaid should evaluate to [Pid⇒P5, Cost⇒4,000].

Since our algorithm works with delete bags and insert bags, it need not know anything about what kind of changes occurred in the rows being inserted and deleted. Thus, in the example, it simply produces the delete bag, ∇Unpaid, as follows:

$$[\Pi_{Pid,Cost}(\Delta\text{Paid}) - \Pi_{Pid,Cost}(\nabla\text{Paid})] \text{ min Unpaid},$$

and the insert bag, ΔUnpaid, like this:

$$(\Pi_{Pid,Cost}(\nabla\text{Paid}) - \Pi_{Pid,Cost}(\Delta\text{Paid})) - (V_2 - V_1).$$

The min operator used to produce ∇Unpaid is defined as follows: S min T is a multiset such that the number of occurrences of a record r in it is min(n,m), where n and m are numbers of occurrences in S and T respectively.

An advantage of the way that the delete and insert bags are defined is that evaluation of the expressions for ∇Unpaid and ΔUnpaid can be made very efficient. First we assume that all relations S1,S2 and Unpaid have an index built on the them that uses Pid as a key. Then, in order to evaluate the expressions for ∇Unpaid and ΔUnpaid we only have to find the numbers of occurrences of elements of $\Pi_{Pid,Cost}(\nabla\text{Paid})$ and $\Pi_{Pid,Cost}(\Delta\text{Paid})$ in $V_1$, $V_2$ and $\Pi_{Pid,Cost}(\text{Paid})$. For example, to find ∇Unpaid, for each r ∈ ΔPaid we find x,y,z, υ as the numbers of occurrences of r in ΔPaid, ∇Paid, $V_1$ and $V_2$. Then R occurs min {(x−y),(z−υ)} times in ∇Unpaid. Thus, the complexity of such evaluation depends on how fast we can access elements of the base relations, not on how fast we can access the views. Typically, access to base relations is much faster than access to views. Even if no index exists, the time complexity is still linear in the sizes of the base relations.

Another big benefit of the above approach is reduced memory requirements. Whereas recomputing the whole view Unpaid would require memory space linear in the size of base relations, the propagation algorithm only requires that we find the number of occurrences of certain records in base relations and then evaluate an arithmetic expression. Therefore, space needed for updating the view Unpaid is linear in the size of changes to the base relations. Typically, the number of rows which change is relatively small compared to the number of rows in the relations. Thus, calculating changes to the view as opposed to recomputing the view leads to substantial improvement in space usage.

Once changes to Unpaid are calculated, the new value of Owe is found as $$\text{Owe}^{new} = (\text{Owe} - \text{TOTAL}(\Pi_{Cost}(\nabla\text{Unpaid}))) + \text{TOTAL}(\Pi_{Cost}(\Delta\text{Unpaid})).$$

The correctness of this is guaranteed for our solution. Indeed, $\text{Owe}^{new}$ calculated above is $10,100, and one can see that it is the correct amount still owed once changes to Paid have been made.

The Bag Algebra

Several equivalent approaches to bag-based database languages have been proposed. See S. Grumbach, T. Milo, Towards tractable algebras for bags, In *PODS*-93, pp.49–58; L. Libkin, L. Wong, Aggregate functions, conservative extension, and linear order, in *Proc. Database Programming Languages,* Springer Verlag, 1994, pp. 97–114; and L. Libkin, L. Wong, New techniques for studying set languages, bag languages, and aggregate functions, in *PODS*- 94, pp. 155–166. The bag-based database language that we use to formulate the change propagation algorithm differs from the proposed languages in that it is restricted to to flat bags (that is, bag-valued attributes are not allowed).

Definitions of Bag Algebra Operations

In what follows, base relation names are denoted by the symbols R, $R_1$, $R_2$, . . . .. Let p range over quantifier-free predicates, and A range over sets of attribute names. $\mathcal{BA}$ expressions are generated by the following grammar.

| S | ::= φ | empty bag |
|---|---|---|
| | \| R | name of stored bag |
| | \| $\sigma_p(S)$ | selection |
| | \| $\Pi_A(S)$ | projection |
| | \| $S \uplus S$ | additive union |
| | \| $S \doteq S$ | monus |
| | \| S min S | minimum intersection |
| | \| S max S | maximum union |
| | \| $\epsilon(S)$ | duplicate elimination |
| | \| $S \times S$ | cartesian product |

To define the semantics of these operations, let count(x, S) be the number of occurrences of x in a bag S. Then, for any operation e in the language, we define count(x, e(S,T)) or count(x,e(S)) as a function of count(x, S) and count(x, T) as follows:

$$\text{count}(x, \sigma_p(S)) = \begin{cases} \text{count}(x,S) & p(x) \text{ is true} \\ 0 & p(x) \text{ is false} \end{cases}$$

$$\text{count}(x, \Pi_A(S)) = \sum_{y \in S, \Pi_A(y) = x} \text{count}(y,S)$$

$$\text{count}(x, S \uplus T) = \text{count}(x,S) + \text{count}(x,T)$$

$$\text{count}(x, S \doteq T) = \max(\text{count}(x,S) - \text{count}(x,T), 0)$$

$$\text{count}(x, S \text{ min } T) = \min(\text{count}(x,S), \text{count}(x,T))$$

$$\text{count}(x, S \text{ max } T) = \max(\text{count}(x,S), \text{count}(x,T))$$

$$\text{count}(x, \epsilon(S)) = \begin{cases} 1 & \text{count}(x,S) > 0 \\ 0 & \text{count}(x,S) = 0 \end{cases}$$

$$\text{count}((x,y), S \times T) = \text{count}(x,S) \times \text{count}(y,T)$$

This language is not intended to be minimal. For example, min can be defined as S min T def S− (S−T). For the full characterization of interdefinability of the operations of $\mathcal{BA}$, consult Libkin and Wong, Some Properties . . ., supra.

We use the symbols S, T, W, and Z to denote arbitrary $\mathcal{BA}$ expressions, and s to denote a database state, that is, a partial map from relation names to multisets. If s is a database state and T is a $\mathcal{BA}$ expression such that s is defined on all relation names mentioned in T, then s(T) denotes the multiset resulting from evaluating T in the state s. (Note that s is a function, so we consider evaluating T in s as the result of applying s to T.) The notation $T=_b S$ means that for all database states s, if s is defined on all relation names mentioned in S and T, then s(T)=s(S).

Specification of Transactions

A transaction is a program that changes the state of a database in one atomic step. There are many approaches to languages for specifying transactions. Here, we adopt an abstract view of transactions, in order to make the results independent of a particular language used, but at the same time readily applicable to any such language.

The abstract transactions to be considered are of the form $$t = \{R_1 \leftarrow (R_1 \dot{-} \nabla R_1) \uplus \Delta R_1,$$
$$\ldots,$$
$$R_n \leftarrow (R_n \dot{-} \nabla R_n) \uplus \Delta R_n\}.$$

As before, the expression $\nabla R_i$ represents a bag deleted from relation $R_i$ and $\Delta R_i$ represents a bag inserted into base relation $R_i$. More formally, when transaction t is executed in state s of the data base, then value of $R_i$ in state t(s) becomes $s((R_i-\nabla R_i)+e,sez\ U++ee\ \Delta R_i)$.

A pre-expression for a transaction is an expression which can be evaluated before the transaction to determine the result of the transaction. In the case of an update of a materialized view, the pre-expression indicates how the materialized view is to be updated; in the case of consistency checking, the value of the pre-expression indicates whether the results of the transaction are consistent with the data base's consistency constraints; in the cases of monitors, triggers, and active queries, the value of the pre-expression indicates which monitor, trigger, or active query will be activated.

More formally, The expression T is a pre-expression of S w.r.t. t if for every database state s we have $s(T)=_b t(s)(S)$. It is easy to check that $$\text{pre}(t,S) \overset{def}{=} S((R_1 \dot{-} \nabla R_1) \uplus \Delta R_1,$$
$$\ldots,$$
$$(R_n \dot{-} \nabla R_n) \uplus \Delta R_n))$$

is a pre-expression of S w.r.t.t.

Goals to be Achieved by the Technique

The aim of the technique is to provide an algorithm for generating strongly minimal pre-expressions for view maintenance at compile time which are computationally more efficient than recomputation of the materialized view. More particularly, suppose $S(R_1, \ldots R_n)$ is a $\mathcal{BA}$ expression and t is a transaction. We would like to determine how t's changes to the base relations propagate to changes in the value of S. In particular, we seek to construct expressions $\Delta S$ and $\nabla S$, called a solution for pre(t,S), which may be used in pre-expressions of the form $$\text{pre}(t,S)=_b(S-\nabla S) \uplus \Delta S.$$

Clearly, not all pre-expressions having the above form are equally acceptable. For example, $\nabla S=S$ and $\Delta S=\text{pre}(t,S)$ is always a solution. What are "good" solutions? First, if S is a materialized view, then it will be generally cheaper to evaluate $(S-\nabla S) \uplus \Delta S$ than to evaluate pre(t,S) in the current state (or to evaluate S after t has been executed). Second, we will impose some "minimality" conditions on $\nabla S$ and $\Delta S$ to make sure that no unnecessary tuples are produced. In particular, 1. $\nabla S-S=_b \phi$: We only delete tuples that are in S.
2. $\Delta S \min \nabla S=_b \phi$: We do not delete a tuple and then reinsert it.

A solution meeting condition (1) will be called weakly minimal, while a solution meeting both conditions (1) and (2) will be called strongly minimal. Note that, in contrast to the relational case, it does not make sense to insist that S be disjoint from $\Delta S$ since a transaction may increase the multiplicities of elements in S.

Minimality (weak or strong) is especially desirable due to the way in which changes interact with aggregate functions. For example, we have $$\text{TOTAL}((S-\nabla S) \uplus \Delta S)=(\text{TOTAL}(S)-\text{TOTAL}(\nabla S))+\text{TOTAL}(\Delta S)$$

assuming a (weakly or strongly) minimal solution.

Again, not all strongly minimal solutions are equally acceptable. For example, the pair $$\nabla Q=Q-\text{pre}(t,Q)$$

and $$\Delta Q=\text{pre}(t,Q)-Q$$

is a strongly minimal solution. However, there is no advantage in using it to maintain the view given by Q.

The Algorithm for Finding Strongly Minimal Pre-Conditions

The following discussion will first present the collection of change propagation equations employed in the preferred embodiment and will then describe the recursive algorithm used in the preferred embodiment to apply the change propagation equations.

The Change Propagation Equations: FIG. 6

As already pointed out, techniques for doing equational reasoning using equations written in a relational algebra have been described in the Qian-Wiederhold reference supra. That reference discloses a change propagation algorithm which is based on a collection of equations that are used to "bubble up" change sets to the top of an expression. For example, the Qian-Wiederhold reference uses the equation $$(S \cup \Delta S)-T=(S-T) \cup (\Delta S-T)$$

to take the insertion $\Delta S$ into S and propagate it upward to the insertion $\Delta S-T$ into S-T.

Our algorithm is based on a collection of such propagation rules for expressions in the bag algebra $\mathcal{BA}$. Finding such a collection is complicated by the fact that $\mathcal{BA}$ expressions, unlike set-valued relational expressions, do not obey the familiar Boolean algebra used with set-valued relational expressions. When $(S \cup \Delta S)-T$ is replaced with the bag expression $(S \uplus \Delta S)-T$, the above example becomes $$(S \uplus \Delta S)-T=(S-T) \uplus (\Delta S-(T-S)),$$

which is not immediately obvious. FIG. 6 shows the collection 601 of equations for change propagation in bag expressions which are used in the preferred embodiment of the algorithm. Some subexpressions are annotated with a $\nabla$ (for a deletion bag) or a $\Delta$ (for an insertion bag). This annotation simply emphasizes the intended application of these equations: when read as left-to-right rewrite rules, they tell us how to propagate changes upward in an expression. Note that the correctness of these equations involves no assumptions concerning minimality of the change bags.

By repeated applications of the equations in FIG. 6, we can propagate any number of changes upward. For example, consider the expression $U = S \uplus T$. Suppose that $$pre(t, U) =_b ((S - \nabla S) \uplus \Delta S) \uplus ((T - \nabla T) \uplus \Delta T).$$

The changes to S and T can be propagated upward and expressed as changes to U as follows:

$$((S \stackrel{.}{-} \nabla S) \uplus \Delta S) \uplus ((T \stackrel{.}{-} \nabla T) \uplus \Delta T)$$

$$\stackrel{P6}{=_b} (((S \stackrel{.}{-} \nabla S) \uplus \Delta S) \uplus (T \stackrel{.}{-} \nabla T)) \uplus \Delta T$$

$$\stackrel{P6}{=_b} (((S \stackrel{.}{-} \nabla S) \uplus (T \stackrel{.}{-} \nabla T)) \uplus \Delta S) \uplus \Delta T$$

$$\stackrel{P5}{=_b} ((((S \stackrel{.}{-} \nabla S) \uplus T) \stackrel{.}{-} (\nabla T \min T)) \uplus \Delta S) \uplus \Delta T$$

$$\stackrel{P5}{=_b} ((((S \uplus T) \stackrel{.}{-} (\nabla S \min S)) \stackrel{.}{-} (\nabla T \min T)) \uplus \Delta S) \uplus \Delta T$$

$$=_b (U \stackrel{.}{-} \nabla_1 U) \uplus \Delta_1 U$$

where $\nabla_1 U = (\nabla S \min S) \uplus (\nabla T \min T)$ and $\Delta_1 U = \Delta S \uplus \Delta T$. The last step is simply an application of the general rules G1. $(S \ T) \uplus W =_b S \uplus (T \uplus W)$ G2. $(S-T) - W =_b S - (T \uplus W)$ which are applied in order to collect all deletions into one delete bag and all insertions into one insert bag.

Repeated application of the equations of FIG. 6 guarantees a solution, but not necessarily a strongly minimal one. However, the following theorem shows that any solution can be transformed into a strongly minimal one:

Theorem 1 Suppose that $W =_b (Q - \nabla_1 Q) \uplus \Delta_1 Q$. Let $\nabla_2 Q = (Q \min \nabla_1 Q) - \Delta_1 Q$ and $\Delta_2 Q = \Delta_1 Q - (Q \min \nabla_1 Q)$. Then a) $W =_b (Q - \nabla_2 Q) \uplus \Delta_2 Q$ b) $\nabla_2 Q - Q =_b \phi$ c) $\nabla_2 Q \min \Delta_2 Q =_b \phi$.

Returning to the example from above, $\nabla_1 U$ and $\Delta_1 U$ can be transformed to a strongly minimal solution by taking $\nabla_2 U$ to be $$(U \min ((\nabla S \min S) \uplus (\nabla T \min T))) - (\Delta S \uplus \Delta T)$$

and $\Delta_2 U$ to be $$(\Delta S \uplus \Delta T) - (U \min ((\nabla S \min S) \uplus (\nabla T \min T)))$$

Although these expressions are rather complex, they can be greatly simplified to $$\nabla_3 U \stackrel{def}{=} (\nabla S \stackrel{.}{-} \Delta T) \uplus (\nabla T \stackrel{.}{-} \Delta S)$$

$$\Delta_3 U \stackrel{def}{=} (\Delta S \stackrel{.}{-} \nabla T) \uplus (\Delta T \stackrel{.}{-} \nabla S)$$

under the assumption that the solutions $(\nabla S, \Delta S)$ and $(\nabla T, \Delta T)$ are strongly minimal.

The foregoing example provides a simple illustration of the steps employed generally in the preferred embodiment to obtain the algorithm used to compute the strongly-minimal pre-condition.

1. A general solution is derived by repeated application of the propagation rules of FIG. 6.
2. A strongly minimal solution is obtained by application of theorem 1.
3. The results are simplified under the assumption that all solutions for subexpressions are strongly minimal.

In the preferred embodiment, these steps are employed to obtain a recursive algorithm.

Note that if we are only concerned with correctness, then there is considerable freedom in the design of the propagation equations presented in FIG. 6. For example, we could replace equation P8 with $$S - (T - \nabla T) =_b (S - T) \uplus ((S - (T - \nabla T)) - (S - T))$$

However, in designing set of equations 601, we have set out to reduce the amount of computation required to determine the changes to a view. Note that all of the equations in FIG. 6 follow the same pattern. For any operation e and its value $V = e(R_1, \ldots, R_n)$, $n = 1$ or $n = 2$, if one of its arguments changes, then its value V' on changed arguments is obtained as either $V - \nabla$ or $V + +ee$ $\Delta$. The expressions for $\nabla$ and $\Delta$ are always of special form. They are "controlled" by $\nabla R_i$s and $\Delta R_i$s, that is, they can be computing by iterating over those bags and fetching corresponding elements from the base relations, rather than by iterating over the base relations themselves. Furthermore, this special form is preserved in the transformations defined in the above theorem for minimalizing a solution.

For example, to compute $Z = ((\nabla T \min T) - (T - S))$ (rule P8 in FIG. 6), for each element $x \in \nabla T$, let n, m and k be numbers of occurrences of x in $\nabla T$, T and S respectively. Then x occurs $\min(n, m) - (m - k)$ times in Z. Thus, to compute Z, we only fetch elements in $\nabla T$ from T and S. Since $\nabla R_i$s and $\Delta R_i$s are generally small compared to the size of base relations $R_i$s, this special form of expressions for $\nabla$ and $\Delta$ will make the change propagation algorithm suitable for maintaining large views.

The Algorithm for Deriving Pre-expressions:
FIG. 7

This section presents algorithm 701 shown in FIG. 7 for computing a strongly minimal pre-expression for a given view maintenance problem which we employ in the preferred embodiment. That is, given a transaction t and a *BA* expression Q, we will compute expressions $\nabla Q$ and $\Delta Q$ such that $pre(t, Q) =_b (Q - \nabla Q) \uplus Q$.

We first define two mutually recursive functions $\nabla(t, Q)$ 703 and $\Delta(t, Q)$ 705 such that for any transaction t $pre(t, Q) =_b (Q - \nabla(t, Q)) \uplus \Delta(t, Q)$. For readability, we use the abbreviations add(t, S) for $S \uplus \Delta(t, S)$ and del(t, S) for $S - \nabla(t, S)$.

We derived the clauses of functions 703 and 705 using the three steps just described. The last step, namely simplification of the results under the assumption that all recursively derived solutions are strongly minimal, is quite important since the assumption of strong minimality is no longer available when query optimization is done at a later stage. That is also the reason why the minimalization theorem is applied at every stage of the algorithm rather than just once at the end.

The algorithm is simply this: given inputs t and Q, use the functions $\nabla(t,Q)$ and $\Delta(t,Q)$ to compute a solution for pre(t,Q). Note that in other embodiments, $\nabla(t,Q)$ and $\Delta(t,Q)$ could be combined into one recursive function. Thus the algorithm requires only one pass over the expression Q.

The following theorem shows that the functions $\nabla$ and $\Delta$ correctly compute a solution to the view maintenance problem and that they preserve strong minimality.

Theorem 2 Let t be a strongly minimal transaction. That is, $R-\nabla R=_b\phi$ and $\nabla R$ min $\Delta R=_b\phi$ for any $R \leftarrow (R-\nabla R)+e, sez\ U++ee\ \Delta R$ in t. Let Q be a $\mathcal{BA}$ expression. Then 1. pre(t,Q)$=_b(Q-\nabla(t,Q))+e,sez\ U++ee\ \Delta(t,Q)$
2. $\nabla(t,Q)-Q=_b\phi$
3. $\Delta(t,Q)$ min $\nabla(t,Q)=_b\phi$ Although some of the clauses in the definition of functions $\nabla$ and $\Delta$ are rather complex, many of the subexpressions either turn out to be $\phi$ or can be easily simplified to $\phi$.

We can illustrate this with example data base 501 of FIG. 5:

$$V_1 \stackrel{def}{=} (\Pi_{Pid,Cost}(S1) \uplus \Pi_{Pid,Cost}(S2))$$

$$V_2 \stackrel{def}{=} \Pi_{Pid,Cost}(Paid)$$

$$Unpaid \stackrel{def}{=} V_1 - V_2$$

where the t is a transaction that changes Paid to (Paid $-\nabla$Paid)$\uplus\Delta$Paid. Using our change propagation functions, the delete bag can be calculated as follows.

$$\nabla(t, Unpaid)$$
$$= \nabla(t, V_1 - V_2)$$
$$\nabla 5$$
$$= ((\nabla(t, V_1) \dot- \nabla(t, V_2)) \uplus (\Delta(t, V_2) \dot- \Delta(T, V_1)))$$

min Unpaid
$$= ((\phi \dot- \nabla(t, V_2)) \uplus (\Delta(t, V_2) \dot- \phi))\ \text{min Unpaid}$$
$$= \Delta(t, V_2)\ \text{min Unpaid}$$
$$= \Delta(t, \Pi_{Pid,Cost}(Paid))\ \text{min Unpaid}$$
$$\Delta 3$$
$$= [\Pi_{Pid,Cost}(\Delta(t, Paid)) \dot- \Pi_{Pid,Cost}(\nabla(t, Paid))]$$

min Unpaid
$$\nabla 1, \Delta 10$$
$$= [\Pi_{Pid,Cost}(\Delta Paid) \dot- \Pi_{Pid,Cost}(\nabla Paid)]\ \text{min Unpaid}$$

In a similar way we can compute the change bag for insertions, $\Delta(t,Unpaid)$, to be $$[\Pi_{Pid,Cost}(\nabla Paid) - \Pi_{Pid,Cost}(\Delta Paid)] - (V_2 - V_1).$$

One advantage of our approach is that it produces queries that can be further optimized by a query optimizer. Consider the following example. Suppose that we have a view Well-Paid defined as $$\text{WellPaid} = \Pi_{Name}(\sigma_{Salary>50,000}(\text{Employees}))$$

Now if a deletion has been made to Employees, then we compute $$\nabla\text{WellPaid} = \Pi_{Name}(\sigma_{Salary>50,000}(\nabla\text{Employees}))$$

We have treated deletions and insertions as black boxes, but often they are specified in some transaction language or as queries. For example, if $\nabla\text{Employees}=\sigma_{Salary<5,000}(\text{Employees})$, then we can substitute this value for $\nabla\text{Employees}$ in the equation for $\nabla\text{WellPaid}$, obtaining $$\Pi_{Name}(\sigma_{Salary>50,000}(\sigma_{Salary<5,000}(\text{Employees})))$$

for $\nabla\text{WellPaid}$. Any query optimizer that "knows" that $\sigma_{p1}(\sigma_{p2}(S))=\sigma_{p1\&p2}(S)$ and that 5<50 will figure out that $\nabla\text{WellPaid}=\emptyset$ and no computation needs to be done.

0.1 Using Strongly Minimal Solutions with Aggregate Functions

Most database query languages provide a number of aggregate functions such as COUNT, TOTAL, AVG, STDEV, MIN, MAX. It has been observed that all of the above aggregate except MIN and MAX) can be expressed in a query language if the query language is endowed with arithmetic operations and the following summation operator:

$$\Sigma_f x_1, \ldots, x_n = f(x_1) + \ldots + f(x_n)$$

For example, COUNT is $\Sigma_1$ where the function 1 always returns 1; TOTAL is $\Sigma_{id}$, AVG is TOTAL/COUNT. See in this regard L. Libkin, L. Wong, Aggregate functions, conservative extension, and linear order, In: *Proc. Database Programming Languages,* Springer, 1994, pp. 97–114 and L. Libkin, L. Wong, Conservativity of nested relational calculi with internal generic functions, *Information Processing Letters* 49 (1994), pp. 273–280.

Any strongly minimal solution for the view maintenance problem allows us to handle duplicates correctly because the following will hold:

$$\Sigma_f((S-\nabla S)\uplus\Delta S)=(\Sigma_f(S)-\Sigma_f(\nabla S))+\Sigma_f(\Delta S)$$

Now if an aggregate function is defined as AGR(S)=$\rho(\Sigma_{f1}(S), \ldots, \Sigma_{fk}(S))$ where $\rho$ is an arithmetic expression in k arguments, to be able to maintain the value of AGR when the view S changes, one has to keep k numbers, $\Sigma_{fi}(S)$, i=1, ..., k. Once changes to the view ($\nabla S$ and $\Delta S$) become known, the values of $\Sigma_{fi}$ are recomputed by the formula above and then $\rho$ is applied to obtain the value of AGR. For example, AVG(S)=TOTAL(S)/COUNT(S)=$\Sigma_{id}(S)/\Sigma_1(S)$. Assume that n=TOTAL(S) and M=COUNT(S). If S changes and a strongly minimal solution $S''=(S-\nabla S)\uplus\Delta S$ is computed, let $n_1=\Sigma_{id}(\nabla S)$, $n_2=\Sigma_{id}(\Delta S)$, $m_1=\Sigma_1(\nabla S)$, $m_2=\Sigma_1(\Delta S)$. Then AVG(S'') can be computed as $(n-n_1+n_2)/(m-m_1+m_2)$. Notice that all additional computation of aggregates is performed on changes to the views, so one may expect it to be fast.

Two aggregates that require special treatment are MIN and MAX. Assume that MIN(S)=n, and we want to compute MIN($S^n$) where $S^n$=(S−∇S)⊎ΔS strongly minimal. If we compute m=MIN(∇S) and k=MIN(ΔS), then k≦n implies MIN($S^n$)=k and m>n implies MIN($S^n$)=min(n,k). However, if n=m and k≧n, then there is no way to say what the value of MIN($S^n$) is for the minimal value n can be reached at several elements of S and we do not know if all of them were deleted in ∇S. Thus, in only this case one has to recompute $S^n$ in order to evaluate MIN correctly.

Computing Minimal Pre-Conditions in a Data Base System

The foregoing has provided an exposition in a bag algebra of how a to compute a minimal pre-condition for updating a materialized view when the view's base relations have been altered. In the following, we will discuss how the results of the foregoing section can be applied in practical data base systems. We will begin with a discussion of the relationship between the bag algebra and query languages and will then show how minimal pre-conditions are computed and used in a data base system.

Query Languages and Bag Algebras

As pointed out in the Description of the Prior Art, bag algebras describe the same operations that query languages do. The bag algebra can thus be itself used as a query language; all that is required is a data base system 101 whose data base program 113 is able to interpret bag algebra expressions.

More important, because the bag algebra and the query language describe the same operations, expressions in the bag language are equivalent to at least a subset of the expressions in the query language and translations may be made between the bag language expressions and the query language expressions in the subset language expressions and query language expressions may be made. For example, many SQL expressions can be translated into the bag algebra used in the preferred embodiment and any bag algebra expression used in the preferred embodiment may be translated into an SQL expression. One way to take advantage of the mutual translatability between the bag language and the subset of the query language is to receive the query language descriptions of the information needed to obtain the pre-expression, translate them into equivalent bag algebra expressions, use the algorithm to produce the pre-expression in the bag algebra, and then translate the pre-expression back into the query language. Another way is to make query language equivalents of functions 703 and 305 and use them to obtain the query language pre-expression directly from the query language transaction specification.

Figure 3:
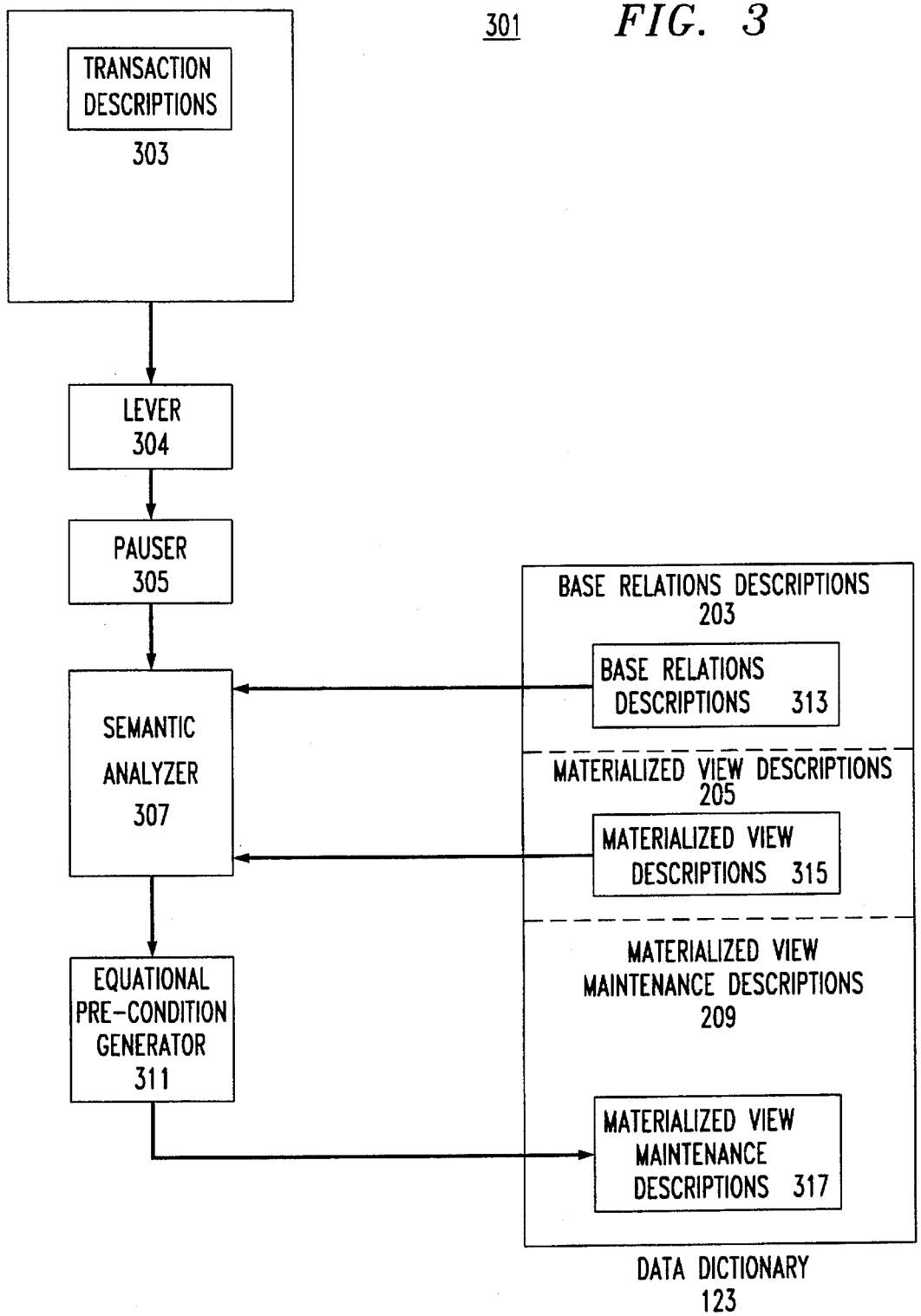
FIG. 3 is a diagram of an equational materialized view description generator.

Making a Pre-Condition in a Data Base System: FIG. 3

FIG. 3 shows a pre-condition compiler 301 which may be used to generate preconditions made with equational reasoning of the kind just described. Precondition compiler 301 is implemented in computer system 101. Compiler 301 takes as its input a transaction description 303 which a user of compiler 301 provides at user interface 102. The transaction description describes the transaction as a change to one or more base relations. The output of compiler 301 is a minimal pre-condition. For purposes of the present discussion, the minimal pre-condition describes how a materialized view is to be maintained and is thus a materialized view maintenance description 317.

Compiler 301 has the usual components, which are implemented in programs which execute on processor 119. The first component is lexer 304, which takes the text string transaction description 303 which was input by the user and divides it into meaningful parts called tokens. The next component is parser 305, which takes the tokens and makes a tree in which each node is one of the tokens. Then semantic analyzer 307 determines the semantics of the tokens. In this case, the information needed to do that is contained in data dictionary 123. Data dictionary 123 contains descriptions 313 of the base relations involved in the transaction and also contains descriptions 315 of materialized views built from the base relations involved in the transaction.

Once semantic analyzer 307 has determined the relationships between the base relations involved in the transaction and the views which must be updated as a consequence of the transaction, equational pre-condition generator 311 can employ algorithm 701 to obtain the minimal pre-conditions for maintaining the affected views. These are then stored as individual materialized view maintenance descriptions 317 in section 209 of data dictionary 123. The descriptions 317 are locatable from the base relation descriptions for the base relations upon which the transactions which require view updates are performed. Details of compiler design and construction may be found in standard works such as Aho, Sethi, Ullman, *Compilers, Principles, Techniques, and Tools*, Addison-Wesley, 1986.

It should be pointed out at this point that transaction description 303 does not describe a specific transaction, but rather a class thereof (for example, any change to a specified column in a base relation) and that each minimal pre-condition also describes a class of actions to be taken, for example those taken when the specified column is changed.

Figure 4:
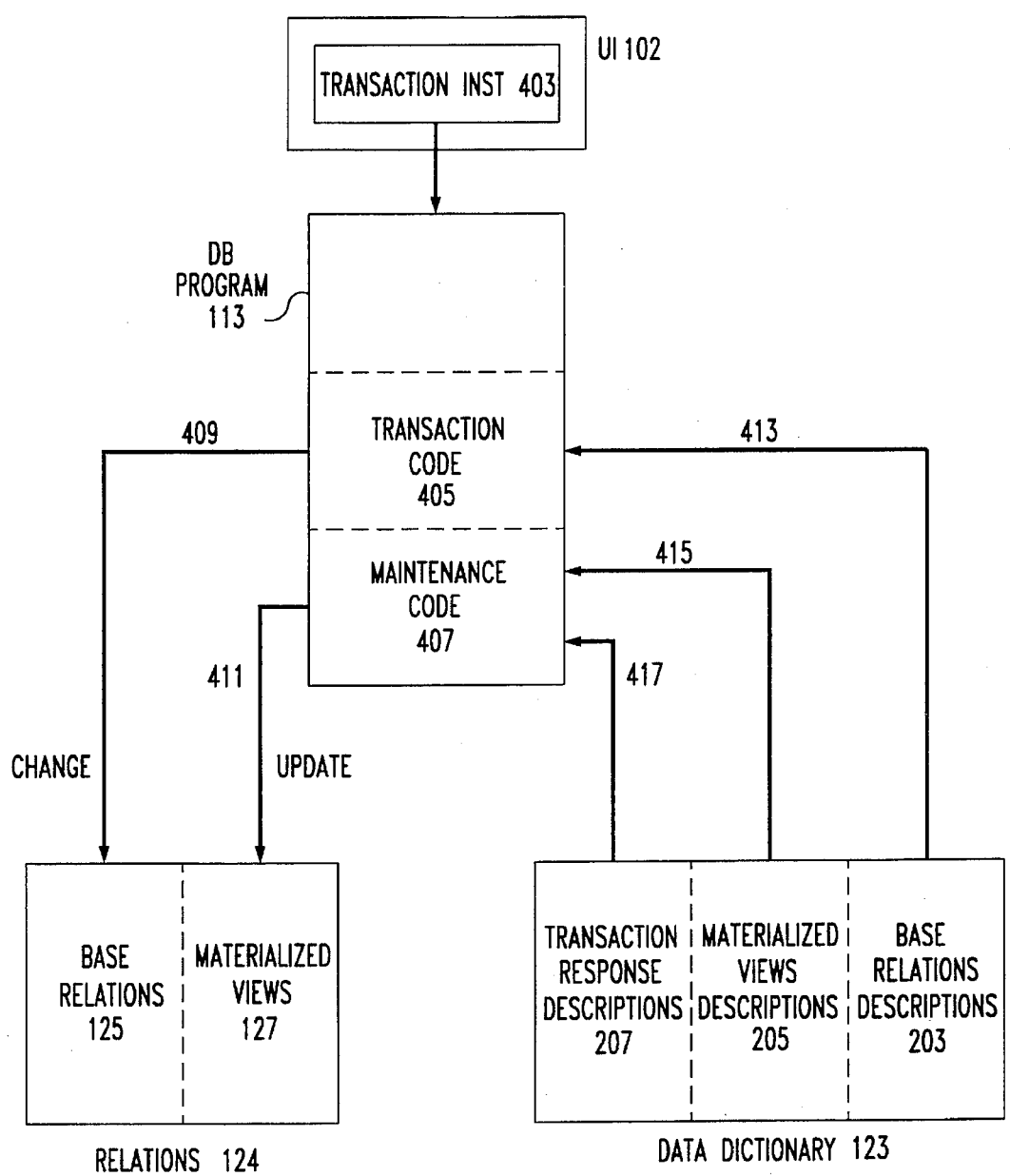
FIG. 4 is a diagram showing how a materialized view maintenance description is used to update a materialized view.

Using a Minimal Pre-Condition in a Data Base System: FIG. 4

FIG. 4 shows a system 401 for using a minimal pre-condition in a data base system. The input to the system is a transaction instance 403 provided by the user at user interface 102. Transaction instance 403 is an instance (particular one) of a class of transaction described in a transaction description 303. Transaction instance 403 is received in data base program 113. Transaction code 405 in data base program 113 responds to transaction instance 403 by obtaining information 413 from base relation descriptions 203 for the base relations 125 changed by the transaction. The information indicates the locations in base relations 125 of the data to be changed in the transaction and also specifies the locations of any materialized view descriptions 205 and transaction response descriptions 207 associated with the base relations being changed. Transaction code 405 changes the base relations 125 as required by the transaction (arrow 409), and if there are transaction response descriptions and materialized view descriptions associated with the base relation descriptions, transaction code 405 invokes maintenance code 407 with the locations of those descriptions.

Maintenance code 407 then uses the associated materialized view descriptions (arrow 415) and the associated transaction response descriptions (arrow 417) to determine haw the materialized views are to be updated and performs the update using the values specified in transaction instance 403, as shown by arrow 411.

Advantages of Using Bag Algebra to Produce Pre-Expressions

Among the advantages of the techniques disclosed herein are the following:

The techniques disclosed herein are linguistically closed. That is, we give explicit algebraic representations to all expressions generated in change propagation, and these are represented in the language $BA$. There is thus never any need to extend the algebraic representations and computation involving the algebraic representations can be optimized as much as possible. Optimization is not restricted to generating change expressions, but can be done at later stages as well.

Next, because our approach is algebraic, it gives a declarative semantics to change propagation that is not tightly bound to one computational model. The language-independent declarative semantics make correctness proofs much easier, simplify the process of extending the algorithm to new constructs, and allow us to apply our results to the production of preconditions generally. For example, suppose that we are given the integrity constraint $$\sigma \stackrel{def}{=} (\forall x \in R_1) \, x.a = \text{count} \underbrace{z \in R_2 : z.b = x.b}_{\text{multiset}}$$

and a strongly minimal transaction $t = \{R_2 \leftarrow (R_2 - \nabla R_2) \uplus \Delta R_2\}$. Furthermore, suppose that we would like to transform t to a safe transaction, t'=if α then t else abort, that can never leave the database in a state violating σ. If we assume that σ will always hold before t' is executed, then we can use our algorithm, together with some logical manipulations, to produce $$(\, x \in R_2)$$

$$\text{count}_{z \in \nabla R_2} : z.b = x.b =$$

$$\text{count}_{z \in \Delta R_2} : z.b = x.b$$

as the formula α.

Finally, we are able to use the inductive assumptions of strong minimality to further simplify our solutions. Since the information required for these simplifications is not available to a general purpose query optimizer, the general purpose optimizer may produce a solution which is less efficient than ones which can be found using our techniques.

Further directions in which our techniques can be developed include providing a specialized query optimizer to take advantage of strong minimality. Such an optimizer would be based on a collection of inference rules for deriving disjointness (for example, if S is disjoint form T, then S–W is disjoint from T–Z) and simplification rules that exploit disjointness (for example, if S is disjoint from T, then S –T simplifies to S). The optimization process is initiated by recognizing that all pairs produced by our algorithm, ($\nabla S$, $\Delta S$), are disjoint.

One current drawback to our approach is that, as with the relational algebra, bag languages such as $BA$ cannot express recursive queries. However, it is possible to extend $BA$ with loops or a fixed-point operator. Another extension of our approach would permit our bag algebra $BA$ to deal with complex objects.

Conclusion

The foregoing Detailed Description has disclosed to those skilled in the data base arts how to use equational reasoning based on a bag algebra to produce minimal preconditions which specify side effects of transactions made on base relations in the data base. The disclosure has shown how the minimal preconditions correctly take duplicate rows into account and how the minimal preconditions may be used in maintaining materialized views, enforcing consistency constraints, determining whether a trigger or monitor action is to be executed, and determining whether an active query should be activated.

Applicants have disclosed the best manner presently known to them of practicing their equational reasoning techniques, but other embodiments are of course possible. In particular, different bag algebras, different propagation equations, and a different algorithm for computing the minimal preconditions may be employed. Further, expressions in the bag algebra may be directly used to specify queries, transactions, and pre-expressions to the data base system or query language instructions equivalent to the bag algebra expressions may be used, with translations being made by the data base system where convenient. In the preferred embodiment, the pre-expressions are produced by compilation and stored in the data dictionary for use at runtime; however, in other embodiments, the pre-expressions may be produced at runtime. Additionally, while the techniques have been disclosed in the context of a relational data base system, they can be employed in any data base system for which bag algebra equivalents of query language expressions exist.

In the preferred embodiment described herein, the transaction response descriptions are part of data dictionary 123 and are executed by code in data base program 113. In other embodiments, the data base management system may include an application program which maintains the response descriptions and uses them to determine what commands are actually given to data base program 113. For example, if the response descriptions are being used to maintain consistency, the application program could use them to check the consequences of a transaction before actually issuing the command for the transaction to the data base system. If the application program determines that the command would violate an integrity constraint, it can then not issue the command.

All of the above being the case, the foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the law.

What is claimed is:

1. A method employed in a data base system of determining a side effect on the data base system of a transaction on a relation in the data base system, the method comprising the steps of:

receiving a description of the transaction in terms of the relation;

transforming the description in accordance with a set of change propagation equations which correctly deal with duplicates to produce a pre-expression which specifies the side effect; and responding to the transaction by producing the side effect specified in the pre-expression.

2. The method set forth in claim 1 wherein:

the description, the change propagation equations, and the pre-expression are all modellable in a bag algebra.

3. The method set forth in claim 2 wherein:

the data base system employs a query language to describe relations and transactions; and the description, the change propagation equations, and the pre-expression are in the query language.

4. The method set forth in claim 1 wherein:

the step of transforming includes the step of computing a delete bag and an insert bag in the pre-expression.

5. The method set forth in claim 4 wherein:

the step of computing a delete bag and an insert bag computes the delete bag and the insert bag such that they are strongly minimal.

6. The method set forth in claim 1 wherein:

the transaction description in the step of receiving a transaction description describes a class of transactions; and the transaction in the step of responding to the transaction description is an instance of the class.

7. The method set forth in claim 6 wherein:

the steps of making the description and transforming the description are performed prior to the receipt of the instance in the data base system.

8. The method set forth in claim 1 wherein:

the step of transforming is applied recursively to the description.

9. The method set forth in any of claims 1, 2, 3, 4, 5, 6, 7, or 8 wherein:

the side effect is an update of a materialized view.

10. The method set forth in claim 9 wherein:

the step of transforming the definition produces a pre-expression which defines how the transaction updates the materialized view in terms of elements of the base relation.

11. The method set forth in any of claims 1, 2, 3, 4, 5, 6, 7, or 8 wherein:

the side effect determines whether the transaction violates a consistency constraint of the data base system.

12. The method set forth in claim 11 wherein:

the side effect is produced prior to performing the transaction.

13. The method set forth in any of claims 1, 2, 3, 4, 5, 6, 7, or 8 wherein:

the side effect activates a trigger in the data base system.

14. The method set forth in any of claims 1, 2, 3, 4, 5, 6, 7, or 8 wherein:

the side effect activates a monitor in the data base system.

15. The method set forth in any of claims 1, 2, 3, 4, 5, 6, 7, or 8 wherein:

the side effect activates an active query in the data base system.

16. A method employed in a data base system of determining a side effect on the data base system of a transaction on a relation in the data base system, the method comprising the steps of:

receiving a description of the transaction in terms of the relation;

transforming the definition in accordance with a set of change propagation equations which deal correctly with sets to produce a pre-expression which specifies the side effect in terms of a strongly minimal delete bag and insert bag; and responding to the transaction by producing the side effect specified in the pre-expression.

17. The method set forth in claim 16 wherein:

the side effect is an update of a materialized view.

18. The method set forth in claim 17 wherein:

the step of transforming the definition produces a pre-expression which defines how the transaction updates the materialized view in terms of elements of the base relation.

19. The method set forth in claim 16 wherein:

the side effect determines whether the transaction violates a consistency constraint of the data base system.

20. The method set forth in claim 28 wherein:

the side effect is produced prior to performing the transaction.

21. The method set forth in claim 16 wherein:

the side effect activates a trigger in the data base system.

22. The method set forth in claim 16 wherein:

the side effect activates a monitor in the data base system.

23. The method set forth in claim 16 wherein:

the side effect activates an active query in the data base system.

24. An improved data base system, the data base system being of the type which includes at least one relation and a definition of the relation and which performs a transaction on the relation and the improvement comprising:

a pre-expression in the data base which specifies a side effect of the transaction on the data base, the pre-expression having been produced by steps including receiving a description of a class of transactions to which the transaction belongs in terms of the relation and transforming the description in accordance with a set of change propagation equations which correctly deal with duplicates to produce a pre-expression which specifies the side effect for transactions belonging to the class; and means responsive to the transaction and the pre-expression for responding to the transaction by producing the side effect specified in the pre-expression.

25. The data base system set forth in claim 24 wherein:

the step of transforming includes the step of computing a delete bag an an insert bag in the pre-expression.

26. The data base system set forth in claim 25 wherein:

the step of computing a delete bag and an insert bag computes the delete bag and the insert bag such that they are strongly minimal.

27. The data base system set forth in any of claims 24, 25 or 26 wherein:

the side effect is an update of a materialized view.

28. The data base system set forth in any of claims 24, 25 or 26 wherein:

the side effect determines whether the transaction violates a consistency constraint of the data base system.

29. The data base system set forth in any of claims 24, 25 or 26 wherein:

the side effect activates a trigger in the data base system.

30. The data base system set forth in any of claims 24, 25 or 26 wherein:

the side effect activates a monitor in the data base system.

31. The data base system set forth in any of claims 18, 19, 24, 25 or 26 wherein:

the side effect activates an active query in the data base system.

32. An improved data base system, the data base system being of the type which includes at least one relation and a definition of the relation and which performs a transaction on the relation and the improvement comprising:

a pre-expression in the data base which specifies a side effect of the transaction on the data base, the pre-expression having been produced by steps including receiving a description of a class of transactions to which the transaction belongs in terms of the relation and transforming the definition in accordance with a set of change propagation equations which deal correctly with sets to produce a pre-expression which specifies the side effect in terms of a strongly minimal delete bag and insert bag;

means responsive to the transaction and the pre-expression for responding to the transaction by producing the side effect specified in the pre-expression.

33. The data base system set forth in claim 325 wherein:

the side effect is an update of a materialized view.

34. The data base system set forth in claim 32 wherein:

the side effect determines whether the transaction violates a consistency constraint of the data base system.

35. The data base system set forth in claim 32 wherein:

the side effect activates a trigger in the data base system.

36. The data base system set forth in claim 32 wherein:

the side effect activates a monitor in the data base system.

37. The data base system set forth in claim 32 wherein:

the side effect activates an active query in the data base system.

\* \* \* \* \*